(12) United States Patent
Hamstra

(10) Patent No.: US 8,279,646 B1
(45) Date of Patent: Oct. 2, 2012

(54) COORDINATED POWER SEQUENCING TO LIMIT INRUSH CURRENTS AND ENSURE OPTIMUM FILTERING

(75) Inventor: James R. Hamstra, Tigard, OR (US)

(73) Assignee: Flextronics AP, LLC, Broomfield, CO (US)

( * ) Notice: Subject to any disclaimer, the term of this patent is extended or adjusted under 35 U.S.C. 154(b) by 769 days.

(21) Appl. No.: 12/316,509

(22) Filed: Dec. 12, 2008

Related U.S. Application Data

(60) Provisional application No. 61/007,666, filed on Dec. 14, 2007.

(51) Int. Cl.
*H02M 3/335* (2006.01)
(52) U.S. Cl. ............... 363/80; 363/82; 363/89; 363/90
(58) Field of Classification Search .............. 363/80, 363/82, 89, 90, 96, 97
See application file for complete search history.

(56) References Cited

U.S. PATENT DOCUMENTS

| | | | |
|---|---|---|---|
| 4,051,425 A | 9/1977 | Smith | 363/86 |
| 4,273,406 A | 6/1981 | Okagami | |
| 4,563,731 A | 1/1986 | Sato et al. | |
| 4,645,278 A | 2/1987 | Yevak et al. | |
| 4,695,933 A | 9/1987 | Nguyen et al. | |
| 4,712,160 A | 12/1987 | Sato et al. | 361/388 |
| 4,788,626 A | 11/1988 | Neidig et al. | 361/386 |
| 4,806,110 A | 2/1989 | Lindeman | |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | 363/26 |

(Continued)

FOREIGN PATENT DOCUMENTS

JP 4217869 A 8/1992

(Continued)

OTHER PUBLICATIONS

EE Times.com—"Team Claims Midrange Wireless Energy Transfer", by R. Colin Johnson, 4 pages, Nov. 20, 2006.

(Continued)

*Primary Examiner* — Nguyen Tran
(74) *Attorney, Agent, or Firm* — Haverstock & Owens LLP

(57) ABSTRACT

A regulated power supply apparatus and method is provided. A converter circuit is configured to generate a regulated voltage signal from an unregulated voltage signal. A power sequencing circuit includes an unregulated voltage source input terminal and is configured for coupling an unregulated voltage signal to an unregulated voltage signal input terminal of the converter circuit. The power sequencing circuit includes an enable output coupled to the enable signal input terminal and includes a power limiting circuit and a trigger circuit. The power limiting circuit includes a first cascade of discrete analog components as controls for a first switching element and the trigger circuit includes a second cascade of discrete analog components as controls for a second switching element. The first cascade is configured as a charge control circuit for controlling a rate of charge of a first filter network and includes a zener diode coupled in parallel. The second cascade is configured as a detector of voltage levels and generates the enable signal. The first and second switching elements are semiconductor switches. The first filter network is coupled upstream of the converter circuit and a second filter network is coupled downstream. In an exemplary embodiment, the converter circuit is a DC to DC bus converter circuit and the regulated power supply apparatus is a fan controller circuit.

32 Claims, 5 Drawing Sheets

U.S. PATENT DOCUMENTS

| | | | |
|---|---|---|---|
| 4,899,256 A | 2/1990 | Sway-Tin | 361/386 |
| 4,975,821 A | 12/1990 | Lethellier | |
| 5,090,919 A | 2/1992 | Tsuji | |
| 5,101,322 A | 3/1992 | Ghaem et al. | 361/386 |
| 5,132,890 A | 7/1992 | Blandino | |
| 5,164,657 A | 11/1992 | Gulczynski | 323/275 |
| 5,235,491 A | 8/1993 | Weiss | 361/694 |
| 5,262,932 A | 11/1993 | Stanley et al. | 363/26 |
| 5,295,044 A | 3/1994 | Araki et al. | 361/709 |
| 5,365,403 A | 11/1994 | Vinciarelli et al. | |
| 5,438,294 A | 8/1995 | Smith | |
| 5,490,052 A | 2/1996 | Yoshida et al. | |
| 5,565,761 A | 10/1996 | Hwang | 323/222 |
| 5,565,781 A | 10/1996 | Dauge | 324/403 |
| 5,592,128 A | 1/1997 | Hwang | 331/61 |
| 5,673,185 A | 9/1997 | Albach et al. | |
| 5,712,772 A | 1/1998 | Telefus et al. | |
| 5,742,151 A | 4/1998 | Hwang | 323/222 |
| 5,747,977 A | 5/1998 | Hwang | 323/284 |
| 5,786,687 A | 7/1998 | Faulk | |
| 5,790,395 A * | 8/1998 | Hagen | 363/89 |
| 5,798,635 A | 8/1998 | Hwang et al. | 323/222 |
| 5,804,950 A | 9/1998 | Hwang et al. | 323/222 |
| 5,811,895 A | 9/1998 | Suzuki et al. | 307/125 |
| 5,818,207 A | 10/1998 | Hwang | 323/288 |
| 5,838,554 A | 11/1998 | Lanni | |
| 5,859,771 A | 1/1999 | Kniegl | |
| 5,870,294 A | 2/1999 | Cyr | 363/41 |
| 5,894,243 A | 4/1999 | Hwang | 327/540 |
| 5,903,138 A | 5/1999 | Hwang et al. | 323/266 |
| 5,905,369 A | 5/1999 | Ishii et al. | 323/272 |
| 5,923,543 A | 7/1999 | Choi | 363/21 |
| 6,058,026 A | 5/2000 | Rozman | |
| 6,069,803 A | 5/2000 | Cross | 363/21 |
| 6,091,233 A | 7/2000 | Hwang et al. | 232/222 |
| 6,091,611 A | 7/2000 | Lanni | |
| 6,160,725 A | 12/2000 | Jansen | 363/65 |
| 6,183,302 B1 | 2/2001 | Daikuhara et al. | |
| 6,272,015 B1 | 8/2001 | Mangtani | 361/707 |
| 6,275,397 B1 * | 8/2001 | McClain | 363/89 |
| 6,282,092 B1 | 8/2001 | Okamoto et al. | 361/704 |
| 6,323,627 B1 | 11/2001 | Schmiederer et al. | |
| 6,326,740 B1 | 12/2001 | Chang et al. | |
| 6,344,980 B1 | 2/2002 | Hwang et al. | |
| 6,388,897 B1 | 5/2002 | Ying et al. | |
| 6,390,854 B2 | 5/2002 | Yamamoto et al. | |
| 6,396,277 B1 | 5/2002 | Fong et al. | 324/402 |
| 6,407,514 B1 | 6/2002 | Glaser et al. | 315/247 |
| 6,459,175 B1 | 10/2002 | Potega | |
| 6,469,914 B1 | 10/2002 | Hwang et al. | 363/210.1 |
| 6,469,980 B1 | 10/2002 | Takemura et al. | 369/275.3 |
| 6,483,281 B2 | 11/2002 | Hwang | 323/299 |
| 6,487,095 B1 | 11/2002 | Malik et al. | |
| 6,487,098 B2 * | 11/2002 | Malik et al. | 363/89 |
| 6,531,854 B2 | 3/2003 | Hwang | 323/285 |
| 6,541,944 B2 | 4/2003 | Hwang | 323/225 |
| 6,549,409 B1 | 4/2003 | Saxelby et al. | |
| 6,583,999 B1 | 6/2003 | Spindler et al. | |
| 6,605,930 B2 | 8/2003 | Hwang | 323/225 |
| 6,657,417 B1 | 12/2003 | Hwang | 323/222 |
| 6,671,189 B2 | 12/2003 | Jansen et al. | 363/21.14 |
| 6,674,272 B2 | 1/2004 | Hwang | 323/284 |
| 6,775,162 B2 | 8/2004 | Mihai et al. | |
| 6,894,461 B1 | 5/2005 | Hack et al. | |
| 6,919,715 B2 | 7/2005 | Muratov et al. | |
| 6,958,920 B2 | 10/2005 | Mednik et al. | 363/19 |
| 6,970,366 B2 | 11/2005 | Apeland et al. | |
| 7,035,126 B1 | 4/2006 | Lanni | |
| 7,038,406 B2 | 5/2006 | Wilson | |
| 7,047,059 B2 | 5/2006 | Avrin et al. | 600/409 |
| 7,064,497 B1 | 6/2006 | Hsieh | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,274,175 B2 | 9/2007 | Manolescu | |
| 7,286,376 B2 | 10/2007 | Yang | |
| 7,324,354 B2 | 1/2008 | Joshi et al. | |
| 7,386,286 B2 | 6/2008 | Petrovic et al. | |
| 7,450,388 B2 | 11/2008 | Beihoff et al. | |
| 7,499,301 B2 | 3/2009 | Zhou | |
| 7,545,256 B2 | 6/2009 | O'Toole et al. | |
| 7,564,706 B1 | 7/2009 | Herbert | |
| 7,570,497 B2 | 8/2009 | Jacques et al. | |
| 7,639,520 B1 | 12/2009 | Zansky et al. | |
| 7,701,305 B2 | 4/2010 | Lin et al. | |
| 7,764,515 B2 | 7/2010 | Jansen et al. | |
| 2002/0008963 A1 | 1/2002 | Dibene, II et al. | |
| 2002/0011823 A1 | 1/2002 | Lee | 320/137 |
| 2003/0035303 A1 | 2/2003 | Balakrishnan et al. | 363/16 |
| 2004/0183510 A1 | 9/2004 | Sutardja et al. | |
| 2004/0228153 A1 | 11/2004 | Cao et al. | 363/71 |
| 2005/0024016 A1 | 2/2005 | Breen et al. | |
| 2005/0105224 A1 | 5/2005 | Nishi | 361/18 |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0281425 A1 | 12/2005 | Gruet et al. | 381/331 |
| 2006/0022637 A1 | 2/2006 | Wang et al. | |
| 2006/0152947 A1 | 7/2006 | Baker et al. | |
| 2007/0247091 A1 | 10/2007 | Maiocchi | |
| 2008/0191667 A1 | 8/2008 | Kernahan et al. | |
| 2009/0290385 A1 | 11/2009 | Jungreis et al. | |
| 2010/0289466 A1 | 11/2010 | Telefus | |
| 2010/0322441 A1 | 12/2010 | Weiss et al. | |

FOREIGN PATENT DOCUMENTS

| | | |
|---|---|---|
| JP | 10243640 A | 9/1998 |
| JP | 2000083374 A | 3/2000 |
| JP | 2000253648 A | 9/2000 |
| JP | 2004208357 A | 7/2004 |

OTHER PUBLICATIONS

EETimes.com—"Wireless Beacon Could Recharge Consumer Devices", by R.Colin Johnson, 3 pages, Jan. 11, 2007.

Hang-Seok Choi et al. Novel Zero-Voltage and Zero-Current Switching (ZVZCS) Full-Bridge PWM Converter Using Coupled Output Inductor, Sep. 2002 IEEE, pp. 641-648.

New Architectures for Radio-Frequency dc/dc Power Conversion, Juan Rivas et al., Laboratory for Electromagnetic and Electronic Systems, Massachusetts Institute of Technology, Room 10-171 Cambridge, MA 02139, pp. 4074-4084, Jan. 2004.

Scollo, P. Fichera R., "Electronic Transformer for a 12 V Halogen Lamp", Jan. 1999, ST MicroElectronics pp. 1-4.

Notice of Allowance dated Sep. 17, 2010, U.S. Appl. No. 12/079,662, filed Mar. 27, 2008, 27 pages.

International Search Report, PCT/US2011/49438, International filing date Aug. 26, 2011, 10 pages.

* cited by examiner

COORDINATED POWER SEQUENCING TO LIMIT INRUSH CURRENTS AND ENSURE OPTIMUM FILTERING

RELATED APPLICATIONS

This application claims priority under 35 U.S.C. §119(e) of the co-pending U.S. Provisional Application Ser. No. 61/007,666 filed on Dec. 14, 2007, and entitled "COORDINATED POWER SEQUENCING TO LIMIT INRUSH CURRENTS AND ENSURE OPTIMUM FILTERING," which is hereby incorporated by reference in its entirety.

FIELD OF THE INVENTION

The present invention relates to the field of power supplies. More particularly, the present invention relates to a power sequencing circuit for a power supply apparatus.

BACKGROUND

In many applications a voltage regulator is required to provide a voltage within a predetermined range. Some circuits are subject to uncertain and undesirable functioning and even irreparable damage if an input power supply falls outside a certain range.

Many power supplies include power sequencing circuits to control the initial stages of a power supply during turn-on. Power sequencers help control high inrush current and limit power converter turn-on noise. Conventional power sequencing circuits provide a converter enable signal for enabling power converter circuits included within the power supply. The disadvantage of conventional power sequencers include that the charging control signal is either on or off and when turning on does not limit inrushes of current experienced by power supply input circuits. The result is that the input inrush of current is delayed but peak amplitude and spikes are not otherwise limited.

Conventional power sequencers for DC input power supplies do not provide a way to delay the power converter turn-on until the charging of the upstream filter capacitor(s) is actually complete. This is because the conventional sequencers provide only a time-based delay function that does not account for the effect of different input voltages on the charging time of the upstream filter capacitor(s).

Conventional power sequencers also do not limit inrush current for a wide range of input voltages and function optimally only in a narrow range of input voltages. In addition conventional sequencers typically use costly power sequencing integrated circuits (ICs). IC sequencers are difficult to debug and require trial and error in the lab to find the optimal solution.

Accordingly, it is desirable to have a simple discrete analog control circuit that would provided a power sequencing solution that is much more economical, efficient and better suited for limiting inrush current to DC input power converters.

SUMMARY OF THE INVENTION

In accordance with a first aspect of the present invention, a regulated power supply apparatus is provided. The apparatus includes a converter circuit configured to generate a regulated AC or DC output voltage signal from an unregulated DC input voltage signal. The unregulated input voltage signal is generated from an unregulated DC voltage source. The converter circuit includes an unregulated voltage signal input terminal and an enable signal input terminal. A power sequencing circuit includes an unregulated DC voltage source input terminal and is configured for coupling an unregulated voltage signal to the unregulated voltage signal input terminal. The power sequencing circuit includes an enable output coupled to the enable signal input terminal. The power sequencing circuit includes a power limiting circuit and a trigger circuit. The power sequencing circuit is configured to limit spikes of inrush current such as occur during hot swapping to only a few amps, for example 3 or 4 amps. Inrush current without the present power sequencing circuit typically can range between 1000 to 2000 amps for durations of 100s of microseconds.

The power limiting circuit includes a first cascade of discrete analog components as controls for a first switching element and the trigger circuit includes a second cascade of discrete analog components as controls for a second switching element. The first cascade includes a resistor and a capacitor in parallel coupled between a first and a second terminal of the first switching element. The first cascade is configured as a charge control circuit in the power limiting circuit for controlling a rate of charge of a first filter network. The first cascade includes a zener diode coupled in parallel. The second cascade includes a resistor and a capacitor in parallel coupled between a first and a second terminal of the second switching element. The first and second switching elements are semiconductor switches.

The first filter network is coupled upstream of the converter circuit and a second filter network may optionally be coupled downstream of the converter circuit. In an exemplary embodiment, the converter circuit is a DC to DC bus converter circuit and the regulated power supply apparatus is a fan controller circuit.

In other aspects of the present invention, a method of regulating a power supply apparatus in generating a regulated voltage signal is provided.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1:
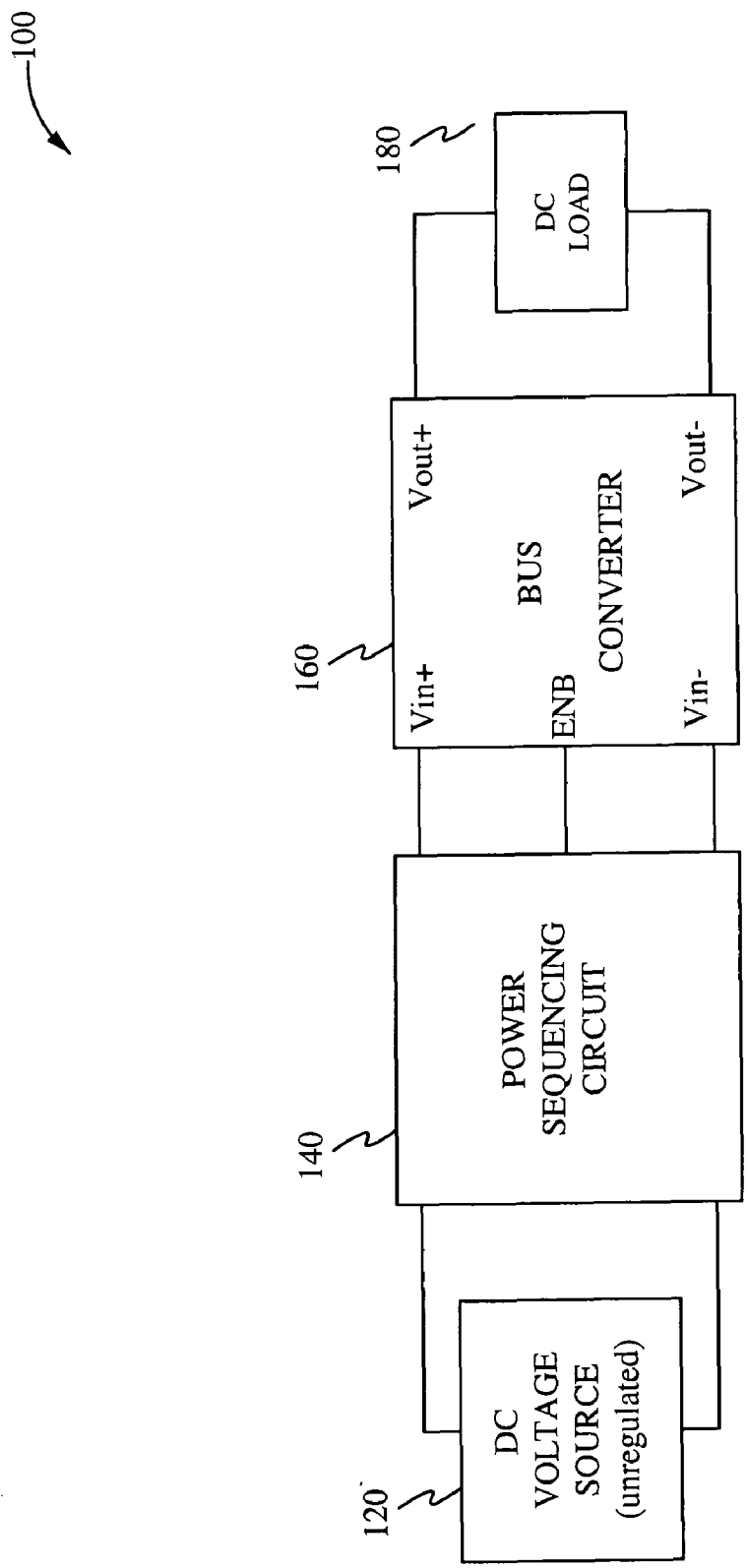
FIG. 1 illustrates a functional block diagram of a power supply apparatus in accordance with an embodiment of the invention.

Turning to FIG. 1, a functional block diagram is shown for a regulated power supply apparatus 100 according to an embodiment of the invention. The apparatus 100 is configured as a buck-type power supply, which includes a power sequencing function. The apparatus 100 facilitates proper sequencing during turn-on and limits voltage and current spikes during turn-on and during normal operation. The apparatus 100 generally includes an unregulated voltage source 120, which may include an AC to DC converter, a motor/generator and/or an array of storage batteries, coupled with a power sequencing circuit 140 that is coupled with a converter circuit 160. The converter circuit 160 is coupled to an output circuit or DC load 180.

The unregulated voltage source 120 generally comprises a DC voltage source. The unregulated voltage source 120 can include an AC input terminal coupled with a bridge rectifier (not shown). The unregulated voltage source 120 can be configured to receive an AC input signal from an AC line or AC source. In one embodiment, the AC input signal can have a voltage potential at a "low-line" range (85VAC-132VAC). Alternatively, the AC input signal can have a voltage potential at a "high-line" (180VAC-264VAC) range. The AC input signal can be coupled from the AC input terminal to the bridge rectifier. The bridge rectifier can generate an unregulated voltage signal. In an exemplary embodiment, the unregulated voltage signal comprises a DC voltage signal. The unregulated voltage signal can be coupled to the power sequencing circuit 140.

The power sequencing circuit 140 receives the unregulated voltage signal and generates an enable signal ENB that is coupled to the converter circuit 160. The power sequencing circuit 140 limits current spikes during apparatus 100 turn-on. The power sequencing circuit 140 delays turn-on of the converter circuit 160 until turn-on voltage and current have properly stabilized. The power sequencing circuit 140 couples the unregulated voltage signal from the unregulated voltage source 120 to the converter circuit 160. The power sequencing circuit 140 can include EMI filtering to reduce turn-on noise of the converter circuit 160. The power sequencing circuit 140 is configured to limit spikes of inrush current such as occur during hot swapping to only a few amps, for example 3 or 4 amps. The spikes of inrush current are limited for a duration of approximately one microsecond. Inrush current and spikes without the present power sequencing circuit 140 typically can range between 1000 to 2000 amps for durations of 100s of microseconds.

The converter circuit 160 receives the enable signal from the power sequencing circuit 140. The enabled converter circuit 160 receives the unregulated voltage signal from the power sequencing circuit 140 and then the converter circuit 160 generates a regulated voltage signal. The converter circuit 160 can be configured as a step down converter circuit. The converter circuit 160 couples the regulated voltage signal to the load circuit 180. In an exemplary embodiment, a downstream filter can be included downstream of the converter circuit 160 coupled between the converter circuit 160 and the load circuit 180. In one embodiment the load circuit 180 can be a logic board within a telecommunications equipment chassis. In another embodiment, the load can be a fan or fan tray such as is commonly used to cool a telecommunications equipment shelf or chassis. Other embodiments are not excluded.

Figure 1A:
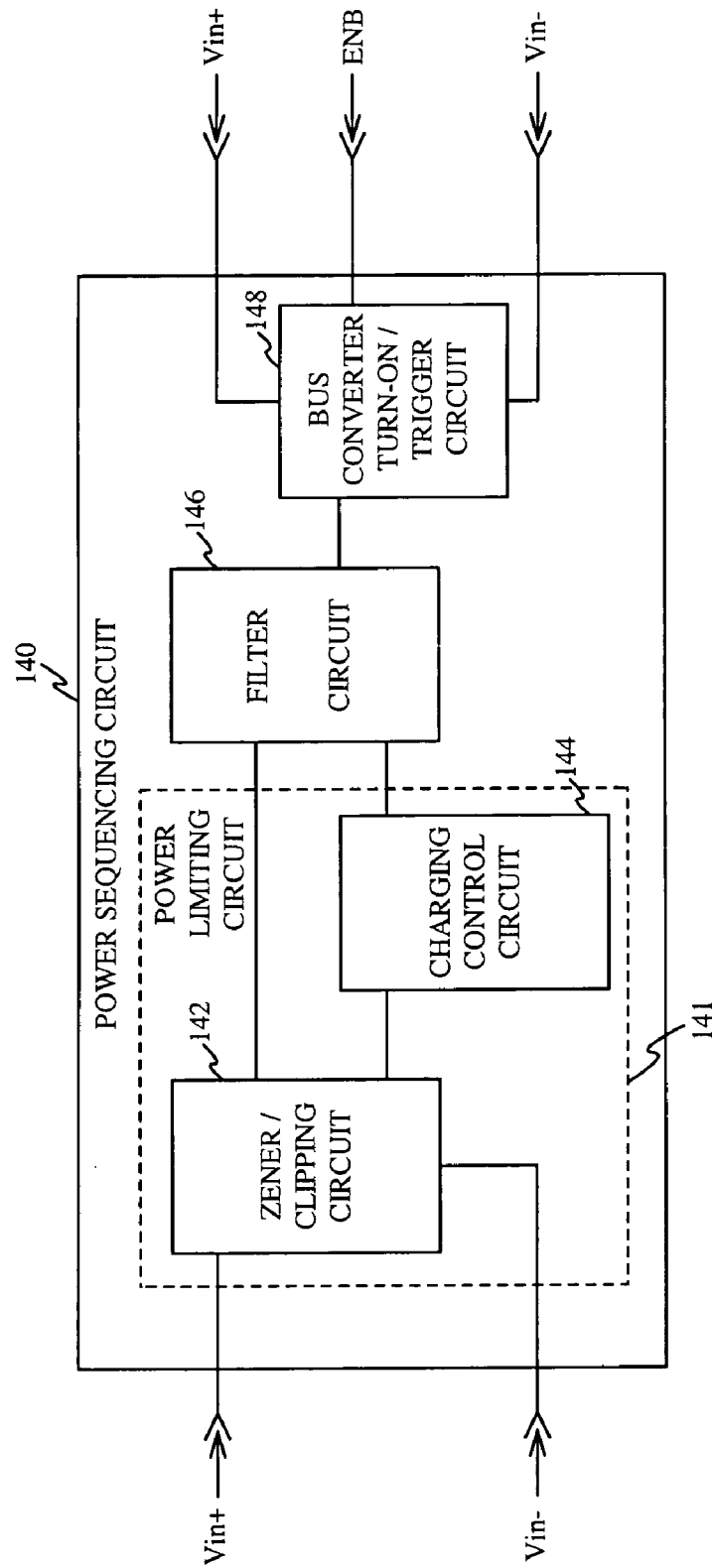
FIG. 1A illustrates a functional block diagram of a power sequencing circuit in accordance with an embodiment of the invention.
Figure 2:
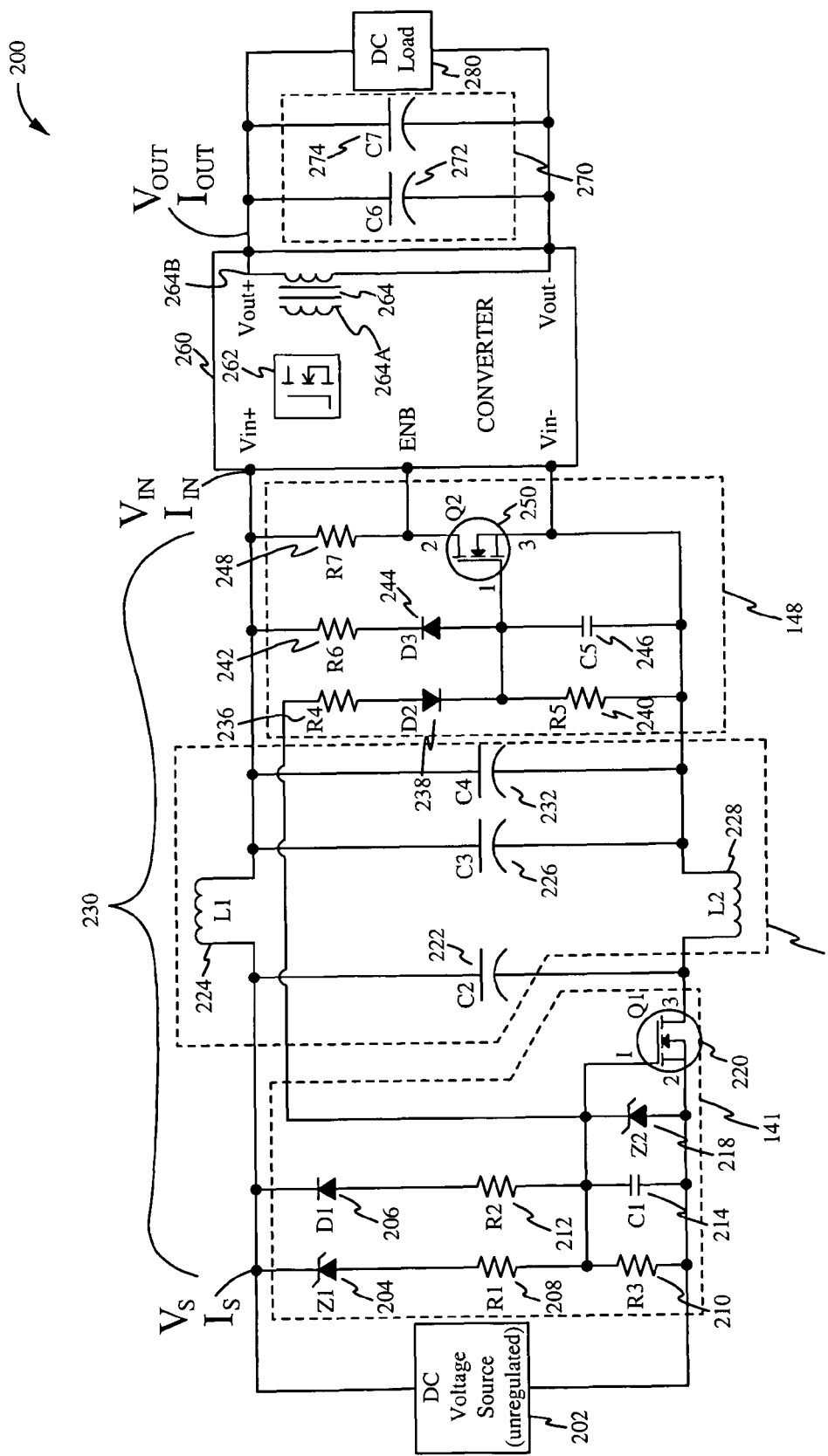
FIG. 2 illustrates a schematic diagram of a power supply apparatus with a power sequencing circuit in accordance with an embodiment of the invention.

FIG. 1A shows an functional block diagram of an exemplary power sequencing circuit 140. The power sequencing circuit 140 generally includes a power limiting circuit 141 coupled with a filter circuit 146 and a bus converter turn-on or trigger circuit 148 coupled with the filter circuit 146. The power limiting circuit 141 can include a clipping circuit 142 coupled with a charging control circuit 144. The clipping circuit 142 limits voltage spikes and current spikes applied to the low voltage devices in the charging control circuit 144 to a specified voltage level. The charging control circuit 144 is configured to control a flow of in rush current to limited levels by controlling a rate of charge of an input capacitor (FIG. 2). The charging control circuit 144 also controls the rate of charge of the filter circuit 146. The filter circuit 146 is configured to reduce EMI noise generated during turn-on and operation of the bus converter circuit 160. The filter circuit 146 can also remove undesirable harmonic noise contained in the AC input signal.

The trigger circuit 148 is coupled with the filter circuit 146 and includes an enable signal output terminal. The trigger circuit 148 couples the unregulated voltage signal to the converter circuit 160. The trigger circuit 148 detects a level of charge of capacitive elements of the filter circuit 146. The trigger circuit 148 generates the enable signal when the capacitive elements of the filter circuit 146 have fully charged. The enable signal is then coupled to the converter circuit 160.

Turning to FIG. 2, a schematic diagram is shown for a regulated power supply apparatus 200, which includes a novel power sequencing circuit. The apparatus 200 generally includes an unregulated voltage source 202, which may include an AC to DC converter, a motor/generator and/or an array of storage batteries, coupled with a power sequencing circuit 230 that is coupled with a converter circuit 260 that is coupled with a load circuit 280. The apparatus 200 can include an output filter 270 coupled downstream of the converter circuit 260.

The unregulated voltage source 202 generally comprises a DC voltage source. The unregulated voltage source 202 can include an AC input terminal (not shown) coupled with a bridge rectifier (not shown), it may optionally include a motor/generator and/or an array of storage batteries. The unregulated voltage source 202 can be configured to receive an AC input signal from an AC line or AC source. In one embodiment, the AC input signal can have a voltage potential at a "low-line" range (85VAC-132VAC). Alternatively, the AC input signal can have a voltage potential at a "high-line" (180VAC-264VAC) range. The AC input signal can be coupled from the AC input terminal to the bridge rectifier. A fusible link or fuse element can be coupled between the AC input terminal and the bridge rectifier. The bridge rectifier can generate an unregulated voltage signal. In an exemplary embodiment, the unregulated voltage signal comprises a DC voltage signal of 32-75 volts DC at the output of an array of storage batteries in a telecommunications equipment facility. In still another embodiment, the unregulated voltage signal comprises a DC voltage signal of 48 volts DC which is the standard operating voltage of the array of batteries. The unregulated voltage signal can be coupled to the power sequencing circuit 230.

The power sequencing circuit 230 generally comprises a power limiting circuit 141 coupled with a filter circuit 146 that is coupled with a bus converter turn-on or trigger circuit 148. The power limiting circuit 141 comprises coupling a cathode of each semiconductor diode 204, 206 to an input terminal 'Vs'. In an exemplary embodiment, the semiconductor diode 204 comprises a zener diode. The anode of the semiconductor diode 204 is coupled to a first terminal of a resistor 208. The anode of the semiconductor diode 206 is coupled to a first terminal of a resistor 212. A second terminal of the resistor 208 is coupled with a first terminal of a resistor 210. A second terminal of the resistor 212 is coupled with a first terminal of an input capacitor 214 and the first terminal of the resistor 210. A cathode of a semiconductor diode 218 is coupled with the first terminal of the input capacitor 214 and a first terminal of a first switching element 220. In an exemplary embodiment, the semiconductor diode 218 comprises a zener diode. An anode of the semiconductor diode 218 is coupled to a second terminal of the first switching element 220 and coupled to a second terminal of the resistor 210 and a second terminal of the input capacitor 214. The first switching element 220 comprises a semiconductor switch. Any number of semiconductor switches known to a person of skill in the art can be used. In an exemplary embodiment, the first switching element 220 comprises a MOSFET (metal-oxide-semiconductor field-effect transistor) transistor. In the exemplary embodiment the values of the zener diodes 204, 218, the resistors 208, 210 and the capacitor 214 are chosen to control and protect the gate charge of the MOSFET 220 so that it ramps up in a controlled manner through its activation phase of the controller operation and discharges rapidly during the shut-down phase. The operation of this circuit is similar to that described in co-pending patent application Ser. No. 11/938,098, filed on or about Nov. 9, 2007, and entitled "POWER FILTER," which is hereby incorporated by reference in its entirety. It must be understood that the series circuit path through the zener diodes 204, 218 interacts with the active gate voltage threshold of the switching element 220 to determine an input voltage range below which the switching element 220 will be turned off, and above which the switching 220 element will be turned on. The rate at which the switching element 220 turns on is controlled by the zener diode 204, the resistors 208, 210 and the capacitor 214. The zener diode 218 limits the maximum control voltage applied to the switching device 220. The diode 206 and resistor 212 serve to rapidly discharge capacitor 214 when the input voltage drops below a defined threshold, thereby turning off the switching element 220.

The filter circuit 146 comprises a first terminal of an inductive element 224 coupled with the cathode of the semiconductor diode 206 and coupled with a first terminal of a filter capacitor 222. A second terminal of an inductive element 224 is coupled with a first terminal of a filter capacitor 226 and coupled with a first terminal of a filter capacitor 232. A second terminal of the filter capacitor 222 is coupled with a first terminal of an inductive element 228 and coupled with a third terminal of the first switching element 220. The second terminal of the inductive element 228 and coupled with a second terminal of the filter capacitor 226 and a second terminal of the filter capacitor 232.

The trigger circuit 148 comprises a first terminal of a resistor 236 coupled with the cathode of the semiconductor diode 218 and a second terminal of the resistor 236 coupled with an anode of a semiconductor diode 238. A first terminal of a resistor 242 is coupled with the second terminal of the inductive element 224 and coupled with a first terminal of a resistor 248. A second terminal of the resistor 242 is coupled with a cathode of a semiconductor diode 244. A cathode of the semiconductor diode 238 and an anode of the semiconductor diode 244 are each coupled with a first terminal of a second switching element 250. A second terminal of the resistor 248 is coupled with a second terminal of the second switching element 250. A first terminal of a resistor 240 and a first terminal of a capacitor 246 are also each coupled with the first terminal of a second switching element 250. A first terminal of the resistor 240 is coupled with the second terminal of the inductive element 228 and coupled with a second terminal of the capacitor 246. The second terminal of the capacitor 246 is coupled with a third terminal of the second switching element 250. The second switching element 250 comprises a semiconductor switch. Any number of semiconductor switches known to a person of skill in the art can be used. In an exemplary embodiment, the second switching element 250 comprises a MOSFET transistor. The connection between the gate of the first switching element 220 in the charging control circuit 144 and resistor 236 in the trigger circuit 148 coordinates the behavior between these two control elements to create the desired sequence of operation. The behavior of the combined circuits ensures that the second switching element 250 does not turn-on until after the first switching element has fully turned-on and the voltage across the capacitors 222, 226, 232 in the filter circuit 146 is close to the average unregulated input voltage. When the charge voltage in the filter circuit 146 approaches its stable value, capacitor 246 in the trigger circuit 148 will begin to charge. After the charging delay of capacitor 246 the control gate to switching element 250 is activated.

The converter circuit 260 comprises an isolated buck-type converter and generally includes a switching circuit 262 coupled with an isolation transformer 264. The isolation transformer 264 is coupled with the load circuit 280. The converter circuit 260 includes an unregulated voltage signal input terminal Vin, an enable signal input terminal 'ENB' and a regulated signal output terminal 'Vout'. The second terminal of the inductive element 224 is coupled with a high line of the unregulated voltage signal input terminal Vin. The second terminal of the second switching element 250 is coupled with the enable signal input terminal ENB. The third terminal of the second switching element 250 is coupled with a low line of the unregulated voltage signal input terminal Vin.

The converter circuit 260 includes the high and low line unregulated voltage signal input terminals Vin+, Vin− coupled with the switching circuit 262 which is coupled with the isolation transformer 264. The switching circuit 262 comprises a semiconductor switch. Any number of semiconductor switches known to a person of skill in the art can be used. In an exemplary embodiment, the switching circuit 262 comprises a MOSFET transistor. The converter circuit 260 can be provided with several different configurations. In an exemplary embodiment, the converter circuit 260 can be configured as a single switch forward converter. A person of skill in the art will appreciate that a two-switch and a four-switch configuration can be substituted for the switching circuit 262. For example, the two-switch configuration (not shown) can comprise a half-bridge converter or even a push-pull converter. The four switch configuration (not shown) can comprise a full-bridge converter.

The isolation transformer 264 includes a primary 264A and a secondary 264B. A turns-ratio of the isolation transformer 264 can be a value that depends on a voltage value chosen for an output voltage Vout. A first terminal of the secondary 264B is coupled with an output filter or downstream filter circuit 270. A second terminal of the secondary 264B is also coupled with the downstream filter circuit 270.

Although the converter circuit 260 in the embodiment is described as an isolating buck-type converter, the reader will understand that any type of isolating or non-isolating DC converter or regulator can be employed when practicing the invention.

The downstream filter circuit 270 includes a first terminal of the filter capacitor 272 and a first terminal of the filter capacitor 274 coupled with a high line of the regulated signal output terminal. A second terminal of the filter capacitor 272 and a second terminal of the filter capacitor 274 are coupled with a low line of the regulated signal output terminal Vout−.

In an alternative embodiment, the downstream filter circuit 270 can include inductive elements. In still another embodiment, the downstream filter circuit 270 can include additional filter capacitors. The value of the filter capacitors can be chosen depending on the application and desired value for Vout.

The load circuit 280 is coupled with the downstream filter circuit 270 and can comprise a variety of DC loads. In an exemplary embodiment, the load circuit comprises a fan or fan tray used for collong electronics equipment. In another exemplary embodiment the load circuit consists of a plurality of logic elements packaged as a circuit board or circuit pack.

The converter circuit 260 includes a pulse width modulation (PWM) module (not shown). The PWM module is used in controlling a duty cycle of the switching circuit 262. The PWM module regulates the output voltage Vout by sampling the output voltage Vout and adjusting the duty cycle of the switching circuit 262 to a higher or lower frequency until the output voltage Vout is approximately equal to a target voltage for Vout. A feedback loop (not shown) can be utilized to provide sensing of the output voltage Vout to the PWM module. PWM modules are commonly used in this manner and a person of skill in the art will appreciate this means as well as other means to regulate the output voltage Vout.

Figure 2A:
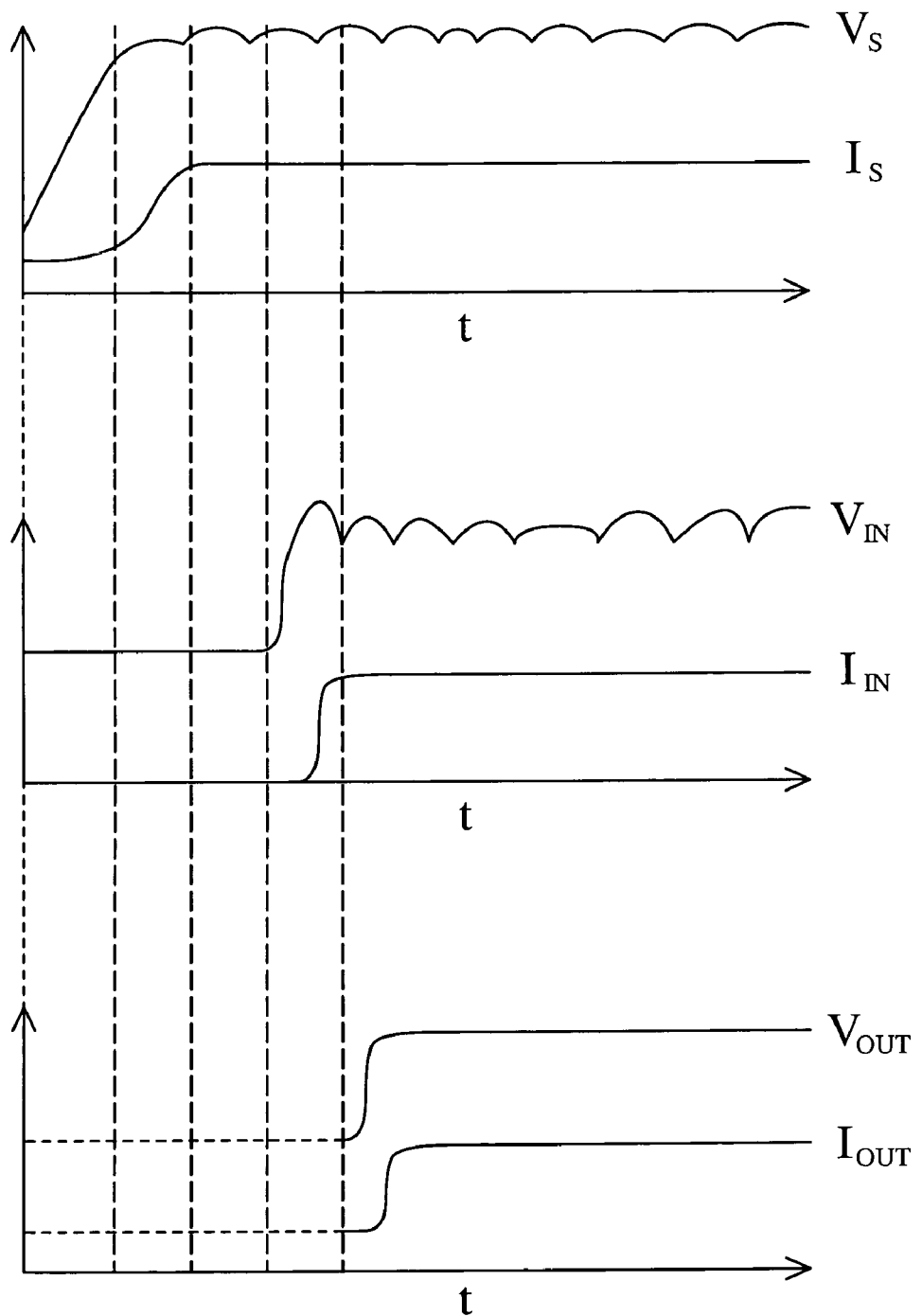
FIG. 2A illustrates a plot for power signals of a power supply apparatus in accordance with an embodiment of the invention.

FIG. 2A illustrates a plot of a sample spice trace for the power supply apparatus 200. The initial unregulated voltage signal Vs and an unregulated current signal 'Is' can be measured at the input terminal Vs. The unregulated voltage signal Vs increases rapidly at turn-on and the unregulated current signal Is lags behind Vs in relation to time. Initial spikes in voltage and current of Vs and 'Is' can be limited and filtered by the power sequencing circuit 230. An unregulated voltage signal Vin and an unregulated current signal Iin can be measured at the unregulated voltage source input terminal Vin. The power sequencing circuit 230 provides a time delay to allow Vin and Iin to stabilize before the converter circuit is enabled. In an exemplary embodiment, the unregulated voltage signal comprises 32-75 volts DC and the unregulated current signal Is comprises 10-15 amps. A regulated voltage signal and current Vout, Iout can be measured at the high and low line of the regulated signal output terminal Vout. The converter circuit 260 operates to smooth and reduce voltage ripples in the unregulated voltage and current signals Vin, Iin. In an exemplary embodiment, the regulated voltage signal Vout comprises 24 volts and the regulated current signal Iout comprises 3.5 amps.

Figure 3:
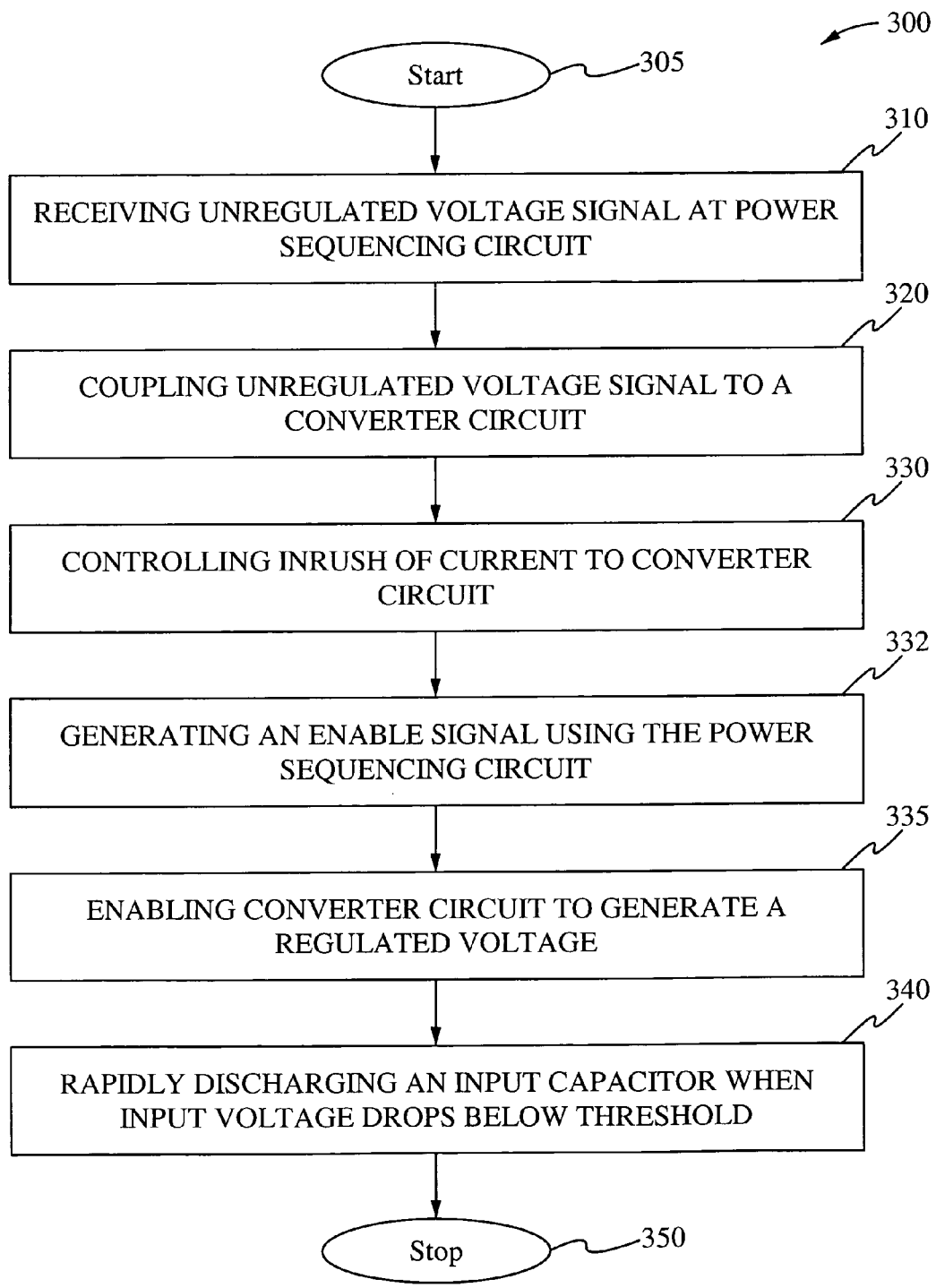
FIG. 3 illustrates a process flow diagram for a method of regulating a power supply apparatus in accordance with the present invention.

Turning to FIG. 3, with reference to FIG. 2, a process flow diagram 300 is shown for a method of regulating a power supply apparatus 200 in accordance with an embodiment of the invention. The power supply apparatus 200 is provided as a power sequencing regulated power converter. The method begins at the step 305. At the step 310 an unregulated voltage signal is received at the unregulated voltage signal input terminal of the power sequencing circuit 230. The power sequencing circuit 230 includes the power limiting circuit 141, the filter circuit 146 and the trigger circuit 148. The power sequencing circuit 230 includes an enable output and is configured to generate an enable signal.

At the step 320, the power sequencing circuit 230 couples the unregulated voltage signal to an unregulated voltage signal input terminal of the converter circuit 260. The converter circuit comprises the switching circuit 262 and the isolation transformer 264. The converter circuit 260 is configured to generate the regulated voltage signal from the unregulated voltage signal that is generated from the unregulated voltage source 202. The converter circuit 260 includes the unregulated voltage signal input terminal Vin, the enable signal input terminal ENB and the regulated signal output terminal Vout.

At the step 330, an input current of the unregulated voltage signal is controlled and coupled to the converter circuit 260 using the power limiting circuit 141. The power limiting circuit 141 includes the first cascade of discrete analog components as controls for the first switching element 220. In an exemplary embodiment, the first cascade and the second cascade of discrete analog components are interconnected and configured so that they operate sequentially. The trigger circuit 148 includes the second cascade of discrete analog components as controls for the second switching element 250. The power limiting circuit 141 reduces power spikes received by the converter circuit 260. The power limiting circuit 141 also includes a charge control circuit comprising the first cascade of discrete analog components that controls a rate of charge of the filter circuit 146 with use of the input capacitor 214. A charge rate of the input capacitor is dependent on the value chosen for the input capacitor 214. The power sequencing circuit 230 is configured to limit spikes of in rush current such as occur during hot swapping to only a few amps, for example 3 or 4 amps. The spikes of in rush current are limited for a duration of approximately one microsecond. In rush current without the present power sequencing circuit 230 typically can range between 1000 to 2000 amps for durations of 100s of microseconds.

At the step 332, the enable signal is generated to the converter circuit 260 using the power sequencing circuit 230. The enable signal is generated when the trigger circuit 148 has detected a predetermined voltage value of the charging filter circuit 146. The predetermined voltage value is reached when the filter circuit 146 has fully charged. The predetermined voltage value can be set depending on the values chosen for the components of the second cascade of discrete analog controls.

At the step 335, the regulated voltage signal is generated as an output signal using the converter circuit 260. The converter circuit 260 receives the enable signal from the trigger circuit 148 at the enable signal input terminal ENB. The regulated voltage signal is received at the downstream filter circuit 270 and the load circuit 280.

At the step 340, the first cascade of the discrete analog components is configured such that the input capacitor 214 rapidly discharges when the value of an input voltage of the unregulated voltage source 202 drops below a defined threshold. When the input voltage drops below the defined threshold, the first switching element 220 of the power limiting circuit 141 is turned off. The rapid discharge of capacitor 214 ensures the power limiting circuit 141 has very little delay in turning off. The step 340 serves to both rapidly discharge the filter capacitance of the filter circuit 146 through the bus converter 260 to the load 280 and then to shut-down the bus converter 280. When the unregulated voltage source 202 input voltage drops below the operating range there are two important reasons for rapidly discharging the filter capacitance of the filter circuit 146. Safety, since if the fan tray or circuit pack is removed from the shelf or chassis it is important to prevent hazardous voltages on an exposed module associated with the removed fan tray. Reliability, since it is important to prevent the load 280 from operating outside its proper operating range. The method terminates at the step 350.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A regulated power supply apparatus comprising:
a converter circuit configured to generate a regulated voltage signal from an unregulated voltage signal that is generated from an unregulated voltage source, the converter circuit comprising an unregulated voltage signal input terminal and an enable signal input terminal; and
a power sequencing circuit including an unregulated voltage source input terminal and configured for coupling an unregulated voltage signal to the unregulated voltage signal input terminal of the converter circuit, the power sequencing circuit including an enable output coupled to the enable signal input terminal, the power sequencing circuit comprising a power limiting circuit and a trigger circuit; and
a first filter network coupled upstream of the converter circuit wherein the trigger circuit does not trigger until the filter circuit has reached a stable charge voltage.

2. The apparatus of claim 1, wherein the power limiting circuit comprises a first cascade of discrete analog components as controls for a first switching element and the trigger circuit comprises a second cascade of discrete analog components as controls for a second switching element.

3. The apparatus of claim 2 wherein the first cascade and the second cascade are interconnected so that they operate sequentially.

4. The apparatus of claim 1, a second filter network coupled downstream of the converter circuit.

5. The apparatus of claim 4, wherein the first filter network is coupled between the power limiting circuit and the trigger circuit.

6. The apparatus of claim 2, wherein the first cascade comprises a resistor and a capacitor in parallel coupled between a first and a second terminal of the first switching element, wherein the first cascade is configured as a charge control circuit in the power limiting circuit for controlling a rate of charge of a first filter network.

7. The apparatus of claim 2, wherein the first switching element comprises a semiconductor switch.

8. The apparatus of claim 2, wherein the first cascade includes a zener diode coupled in parallel therewith.

9. The apparatus of claim 2, wherein the second cascade comprises a resistor and a capacitor in parallel coupled between a first and a second terminal of the second switching element.

10. The apparatus of claim 2, wherein the second switching element detects a power value and generates the enable output.

11. The apparatus of claim 1, wherein the power sequencing circuit is configured to limit spikes of in rush current to less than 5 amps.

12. The apparatus of claim 2, wherein the second switching element comprises a semiconductor switch.

13. The apparatus of claim 1, wherein the unregulated voltage source comprises a DC voltage source.

14. The apparatus of claim 1, wherein the converter circuit comprises a DC to DC bus converter circuit.

15. The apparatus of claim 1, wherein the converter circuit is coupled with a load circuit.

16. The apparatus of claim 1, wherein the regulated power supply is configured as a fan controller circuit.

17. The apparatus of claim 1, wherein the regulated power supply apparatus comprises a logic circuit.

18. A method of a regulating a power supply apparatus in generating a regulated voltage signal comprising:
receiving an unregulated voltage signal at a power sequencing circuit having an unregulated voltage source input terminal, the power sequencing circuit comprising a power limiting circuit and a trigger circuit the power sequencing circuit having an enable output and configured to generate an enable signal;
coupling the unregulated voltage signal to an unregulated voltage signal input terminal of a converter circuit using the power sequencing circuit, the converter circuit configured to generate the regulated voltage signal from the unregulated voltage signal that is generated from an unregulated voltage source, the converter circuit comprising the unregulated voltage signal input terminal and an enable signal input terminal;
controlling an input current of the unregulated voltage signal coupled to the converter circuit using the power limiting circuit;
generating the enable signal to the converter circuit using the power sequencing circuit, the enable signal being generated when the trigger circuit detects a predetermined power value;
generating the regulated voltage signal as an output signal of the converter circuit, the converter circuit receiving the enable signal from the trigger circuit at the enable signal input terminal;
discharging rapidly an input capacitor when a value of an input voltage of the unregulated voltage source drops below a predetermined threshold and charging a first filter network coupled upstream from the converter, wherein the trigger circuit does not trigger until the first filter network is charged to a stable voltage.

19. The method of claim 18, further comprising a first filter network coupled upstream of the converter circuit and a second filter network coupled downstream of the converter circuit.

20. The method of claim 19, further comprising charging the first filter network before the predetermined power value is detected.

21. The method of claim 19, further comprising receiving the regulated voltage signal at the second filter network coupled downstream of the converter circuit.

22. The method of claim 18, wherein the power limiting circuit comprises a first cascade of discrete analog components as controls for a first switching element and the trigger circuit comprises a second cascade of discrete analog components as controls for a second switching element, the power limiting circuit for reducing power spikes received by the converter circuit.

23. The method of claim 22, wherein the first cascade and the second cascade are interconnected so that they operate sequentially.

24. The method of claim 22, wherein the first cascade comprises a resistor and a capacitor in parallel coupled between a first and a second terminal of the first switching element, wherein the first cascade is configured as a charge control circuit in the power limiting circuit for controlling a rate of charge of a first filter network.

25. The method of claim 22, wherein the first switching element comprises a semiconductor switch.

26. The method of claim 22, wherein the first cascade includes a zener diode coupled in parallel therewith.

27. The method of claim 22, wherein the second cascade comprises a resistor and a capacitor in parallel coupled between a first and a second terminal of the second switching element, wherein the second cascade controls the detection of the predetermined power value.

28. The method of claim 18, wherein the power sequencing circuit is configured to limit spikes of in rush current to less than 5 amps.

29. The method of claim 22, wherein the second switching element comprises a semiconductor switch.

30. The method of claim 18, wherein the unregulated voltage source comprises a DC voltage source.

31. The method of claim 18, wherein the converter circuit comprises a DC to DC bus converter circuit.

32. The method of claim 18, wherein output of the converter circuit is coupled with a load.

* * * * *